No. 814,720. PATENTED MAR. 13, 1906.
C. D. MONROE.
EMULSIFIER.
APPLICATION FILED OCT. 18, 1905.
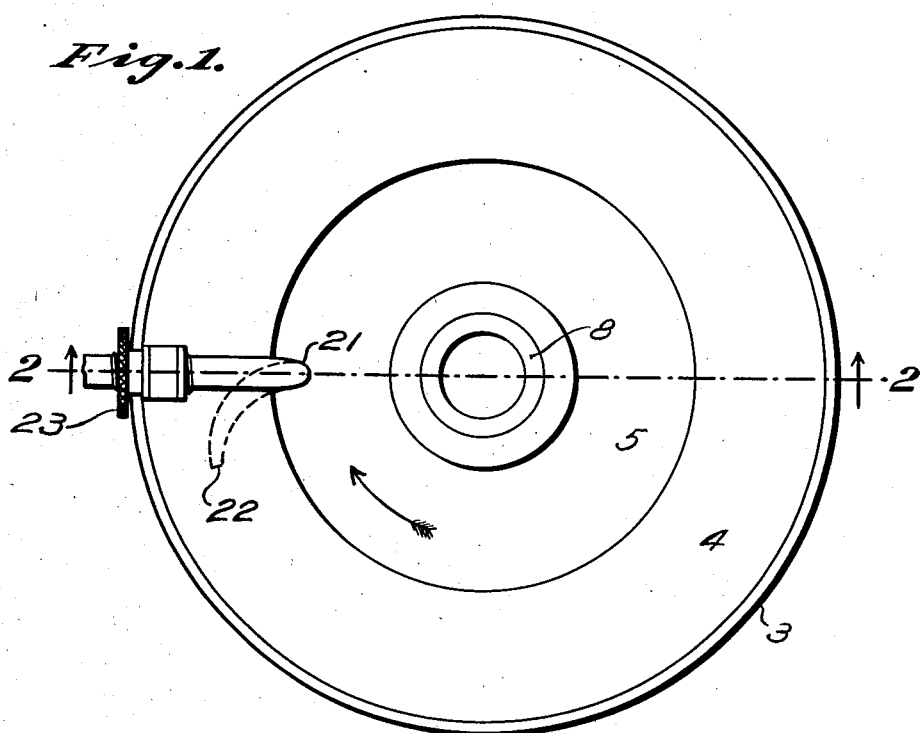
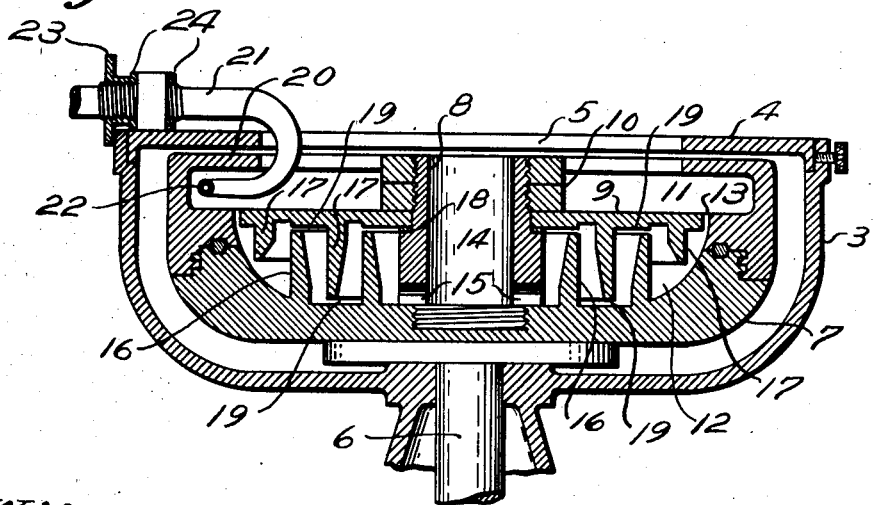
Witnesses:
Andrew Rummler
Glen C. Stephens
Inventor,
Charles Dallas Monroe,
by Rummler & Rummler,
Attorneys.

UNITED STATES PATENT OFFICE.

CHARLES DALLAS MONROE, OF ELGIN, ILLINOIS.

EMULSIFIER.

No. 814,720.　　　　Specification of Letters Patent.　　Patented March 13, 1906.

Application filed October 18, 1905. Serial No. 283,343.

*To all whom it may concern:*

Be it known that I, CHARLES DALLAS MONROE, a citizen of the United States of America, and a resident of Elgin, in the county of Kane and State of Illinois, have invented certain new and useful Improvements in Emulsifiers, of which the following is a specification.

This invention relates to apparatus for producing emulsions, and is particularly adapted for emulsifying milk and butter-oils, as in the manufacture of renovated butter and substitutes for butter.

The main object of this invention is to provide an improved form of centrifugal emulsifier which is adapted to operate continuously with little attention and which may be readily taken apart to permit of access to all of its cavities for the purpose of cleansing the same. I accomplish this object by the device shown in the accompanying drawings, in which—

Figure 1 is a top plan of an emulsifier constructed according to my invention. Fig. 2 is a vertical section of the same on the line 2 2 of Fig. 1.

In the construction shown in the drawings the supporting-frame 3 is in the form of a bowl at its upper part and is provided with a removable cover 4, having a relatively large central opening 5. A vertically-disposed shaft 6 is journaled in the frame 3 concentrically of the bowl and has a bowl-shaped vessel 7 rigidly mounted on its upper end within the bowl of the frame. The shaft 6 is rotated from below by mechanism. (Not shown in the drawings.) The walls of the receptacle 7 are preferably of considerable thickness near the periphery of said vessel, so as to afford a fly-wheel effect and steady the rotation. The vessel 7 is preferably formed of two parts arranged one above the other and having threaded connection, so as to permit of being readily separated for the purpose of cleaning the interior. A central tubular part 8 is rigidly secured to the bottom of the vessel 7 and is open at the top to permit the materials which are to be emulsified to be delivered thereto by one or more pipes entering the upper open end of the tubular part 8, but not shown in the drawings. A horizontal disk or partition 9 is secured to the tubular part 8 by means of a pair of lock-nuts 10 and subdivides the interior of the vessel 7 into two compartments, the upper compartment 11 being of larger diameter than the lower compartment 12. The disk 9 is of slightly-less diameter than the adjacent inner surface of the walls of the vessel 7, so as to provide a narrow annular passage 13, connecting the compartments 11 and 12. The interior of the tubular part 8, which will be herein called the "receiving-chamber" 14, communicates with the compartment 12 by radially-disposed apertures 15 close to the bottom of the vessel. The compartment 12 is again subdivided into concentric annular spaces by means of a plurality of annular partitions 16, which extend upward from the bottom of the vessel 7, and the alternate intermediate partitions, which extend downward from the disk 9. The position of the disk 9 with respect to the bottom of the vessel 7 may be adjusted vertically by varying the number or the thickness of the washers at 18. This provides for varying the width of the passages 19 between the crests of the partitions 16 and 17 and the adjacent surfaces of the disk 9 and the bottom of the vessel 7. The inner surfaces of the partitions 16 and 17 diverge toward their respective passages 19, so that the centrifugal action will cause the contents to flow outwardly through the subdivisions of the compartment 12. As the transverse area of each of the passages 19 is considerably less than that of the adjacent subdivisions of the compartment 12, the contents will flow successively through contracted and enlarged areas, and as the contracted passages are substantially at right angles to the direction of the flow of liquid in each of the subdivisions of said compartment this action will produce a violent eddying effect and cause a thorough mixing or emulsification of the contents.

The contents of the compartment 11 accumulate in the annular space under the flange 20 and are drawn off by means of the curved pipe 21. The nozzle 22 of this pipe is disposed in a direction opposite to the rotation of the vessel, so that the contents of the compartment 11 will pass out through the pipe 21 under their own momentum. The pipe 21 is adjustable by means of a knurled sleeve 23, which has threaded connection with the pipe and is rotatable within a lug on the cover 4 of the supporting-frame. Collars 24 prevent longitudinal shifting of the sleeve.

In operation the materials which are to be emulsified, such as milk and a butter-oil, are first delivered to the receiving-chamber 14 and are caused to rotate with the rotating vessel 7. Centrifugal action causes them to flow through the passages 15 and then through the successive subdivisions of the compartment 12. The diverging inner surfaces of the partitions 16 and 17 also assist this outward flow and direct the contents toward the contracted passages 19. The formation of the bottom and side walls causes the contents of the compartment 12 to pass through the narrow annular passage 13 into the compartment 11, from which they are withdrawn by the pipe 21 in the form of an emulsion.

What I claim as my invention, and desire to secure by Letters Patent, is—

1. An emulsifier comprising a frame, a vessel mounted to rotate on an axis in said frame and having in its interior a central receiving-chamber and an outer annular delivery-chamber, a tortuous passage connecting said chambers to permit the contents of said receiving-chamber to flow outwardly under centrifugal force to said delivery-chamber, said passage comprising a series of alternate portions of enlarged and reduced transverse sectional area communicating with each other, and each portion of said passage being without outlet other than its respective connections with the next preceding and the next succeeding portions, whereby all of the contents of said receiving-chamber will flow successively through said portions and into said delivery-chamber.

2. An emulsifier comprising a frame, a vessel rotatably mounted in said frame and having a central tubular part extending upwardly from the bottom thereof, a horizontally-disposed plate carried by said tubular part and subdividing the interior of said vessel into an upper and lower compartment, said upper compartment being of greater diameter than the lower compartment, a passage connecting said compartments near the outer edge of said plate, a plurality of concentric annular partitions subdividing the interior of said lower compartment, alternate partitions being secured respectively to said plate and the bottom of said vessel, and said partitions being of less height than said lower compartment to provide passages of contracted area connecting the subdivisions of said lower compartment, means for adjusting said plate vertically on said tubular part for varying the areas of said contracted passages, and means for drawing off the contents of the upper compartment.

3. An emulsifier comprising a bowl-shaped vessel, mounted to rotate on a vertically-disposed axis and having in its interior two superimposed compartments, the upper compartment being of considerably-greater diameter than the lower compartment, a central vertically-disposed tubular part rigidly mounted on the bottom of the vessel and communicating at its lower end with said lower compartment, said tubular member being threaded on its outer surface, a horizontally-disposed partition mounted on said tubular part and adapted to separate said upper and lower compartments, said vessel having therein a passage connecting said upper and lower compartments at the outer edge of said partition, a plurality of annular partitions subdividing the interior of said lower compartment, alternate partitions being secured respectively to said horizontal partition and to the bottom of said vessel and all being adapted to agitate the contents while flowing centrifugally outward from said tubular part toward said upper compartment, and one or more nuts meshing with said tubular part and adapted to adjustably secure said horizontal partition thereon, substantially as described.

Signed at Chicago this 11th day of October, 1905.

CHARLES DALLAS MONROE.

Witnesses:
EUGENE A. RUMMLER,
GLEN C. STEPHENS.